United States Patent
Bridges

[11] Patent Number: 5,751,334
[45] Date of Patent: May 12, 1998

[54] PRINTER WITH SUPPORT SHOE AND MEDIA METERING THEREIN

[75] Inventor: Mark E. Bridges, Spencerport, N.Y.

[73] Assignee: Eastman Kodak Company, Rochester, N.Y.

[21] Appl. No.: 371,346

[22] Filed: Jan. 11, 1995

[51] Int. Cl.⁶ .............. B41J 2/435; G01D 15/24; H01S 1/131; G11B 7/00
[52] U.S. Cl. .................................. 347/262; 347/264
[58] Field of Search .................. 347/245, 263, 347/262, 264, 152; 346/136; 101/148; 271/35, 116

[56] References Cited

U.S. PATENT DOCUMENTS

| | | | |
|---|---|---|---|
| 1,746,407 | 2/1930 | Schroter et al. | 347/258 |
| 2,511,892 | 6/1950 | Wise | 100/32 |
| 3,823,276 | 7/1974 | Maslowski et al. | 347/241 |
| 3,925,607 | 12/1975 | Hauber | 346/138 |
| 3,958,250 | 5/1976 | Rolon | 347/262 |
| 4,260,997 | 4/1981 | Fukui | 347/242 |
| 4,260,998 | 4/1981 | Fukui | 347/262 |
| 4,293,864 | 10/1981 | Scott | 347/262 |
| 4,334,770 | 6/1982 | Landsman | 347/264 |
| 4,479,133 | 10/1984 | Shiozawa et al. | 347/242 |
| 4,479,148 | 10/1984 | Sheck et al. | 358/492 |
| 4,595,957 | 6/1986 | Holthusen | 346/136 |
| 4,686,541 | 8/1987 | Rosier | 247/262 |
| 4,698,647 | 10/1987 | Gerlach | 347/258 |
| 4,816,923 | 3/1989 | Saotome | 358/494 |
| 5,004,219 | 4/1991 | Godlewski | 271/116 |
| 5,097,351 | 3/1992 | Kramer | 359/17 |
| 5,101,223 | 3/1992 | Boeve | 347/264 |
| 5,214,528 | 5/1993 | Akanabe et al. | 359/211 |
| 5,218,903 | 6/1993 | MacConnell et al. | 101/148 |
| 5,244,197 | 9/1993 | Helmstädter | 271/35 |

FOREIGN PATENT DOCUMENTS

| | | |
|---|---|---|
| A-383704 | 8/1990 | European Pat. Off. |
| A-2159153 | 5/1973 | Germany |
| A-350244 | 11/1960 | Switzerland |
| A-668589 | 1/1989 | Switzerland |

*Primary Examiner*—N. Le
*Assistant Examiner*—Raquel Y. Gordon
*Attorney, Agent, or Firm*—Milton S. Sales

[57] ABSTRACT

An apparatus for accurately guiding a web of light-sensitive recording media into a cylindrical support shoe of a printer includes a metering roller at the inlet side of a stationary support shoe around which a received media web is wrapped. At least one media guide belt is mounted about a set of pulleys to guide media toward a nip between a pressure roller and the metering roller through which the media is driven into the stationary support shoe. The metering roller is mounted to rotate about a predetermined axis, and the pressure roller has one end held in a frame and is spring loaded into the frame and the metering roller. The other end of the pressure roller is also spring loaded into the metering roller and into an adjustment plate which is pivotal about the axis of the metering roller, whereby the pressure roller can be steered so that the axis of the metering roller and the axis of rotation of the pressure roller are made parallel, and so that the nip between the metering roller and the pressure roller can be adjusted to lie in a plane defined by the axis of the metering roller and the axis of rotation of the pressure roller to cause media to run uniformly and predictably when metering into and out of the cylindrical support shoe.

12 Claims, 4 Drawing Sheets

1

PRINTER WITH SUPPORT SHOE AND MEDIA METERING THEREIN

CROSS-REFERENCE TO RELATED APPLICATIONS

Reference is made to commonly assigned, co-pending U.S. patent applications Ser. No. 08/123,838 entitled LEAD-SCREW COUPLER, filed in the names of Jadrich et al. on Sep. 20, 1993 and now U.S. Pat. No. 5,392,662; Ser. No. 08/123,839 entitled METHOD AND APPARATUS FOR EXPOSING PHOTOSENSITIVE MEDIA WITH MULTIPLE LIGHT SOURCES, filed in the names of Smith et al. on Sep. 20, 1993; Ser. No. 371,346, entitled PRINTER WITH SUPPORT SHOE AND ANTI-BACKUP ROLLER, filed concurrently herewith in the name of Mark E. Bridges; and Ser. No. 08/371,241, entitled DIGITAL PRINTER WITH SUPPORT SHOE AND TRANSLATABLE MEDIA GUIDE MEMBER THEREIN, filed concurrently herewith in the name of Mark E. Bridges.

BACKGROUND OF THE INVENTION

1. Technical Field

The present invention relates generally to film printers utilizing digitized signals, and more particularly to photographic printers that form a web of media into a cylindrical shape for exposure by a rotating light source.

2. Background Art

Photographic printing of digitized images is accomplished by modulating the intensity of a light beam that forms a writing spot on photosensitive media as the beam moves relative to the photosensitive media. One type of printer uses an array of light emitting diodes (LED's) positioned on a rotor which spins within a media support cylinder. The rotor is axially translated through the support cylinder to index the LED array to the next image line or lines. The light emitting diodes can be directly modulated with relatively simple electronic drive circuitry, and can be employed with relatively inexpensive, compact and reliable hardware.

Commonly assigned, co-pending U.S. patent application Ser. No. 08/123,839, filed in the name of Smith et al. on Sep. 20, 1993, discloses a high speed printer capable of producing full color images on conventional photographic paper using digitized information and employing simple and inexpensive light sources. A write head assembly includes a plurality of individually addressable mono-color LED's arranged in columns and rows to emit a plurality of light beams, projection optics, and support electronics. The write head assembly is resident on a rotor which is simultaneously rotated about a fixed axis and linearly translated past stationary photosensitive recording media mounted on the inner surface of a cylindrical "support shoe" to form a plurality of writing spots moving across the photosensitive material in a fast scan direction and in a slow scan direction. The disclosure of the Smith et al. patent is hereby specifically incorporated herein by reference.

When using a printer as disclosed in said U.S. patent application Ser. No. 08/123,839, the photosensitive recording media must be advanced into the support shoe without scratching, and accurately positioned relative to the exposure source while the rotating exposure source traverses the axial length of the cylindrical support shoe. Numerous methods have evolved for manipulating the media relative to the cylindrically formed support shoe during the printing operation.

In U.S. Pat. No. 2,511,892, which issued to Wise on Jun. 20, 1950, the end of a roll is fed through a single-turn drive roller pair. The media is driven between a pair of mandrels and a flexible sheet. The flexible sheet opens and closes about the mandrels, sandwiching the media to the mandrels.

U.S. Pat. No. 3,958,250, which issued to Rolon on May 18, 1976, discloses a printer in which the end of a roll of film is driven into a curved entrance guide shoe. The shoe diverts the film along a curved wall housed within an exposure compartment.

U.S. Pat. No. 4,479,148, which issued to Sheck et al. on Oct. 23, 1984, teaches the use of a transport upon which is taped a flap which retains an exposure or reading medium in sheet form for newspaper printing apparatus. The transport is urged into registration with rotatable mandrels by means of drive rollers. As the mandrels rotate, the transport fills a gap between the mandrels and a curved wall until the transport is cylindrical in form. The media sheets are loaded by hand, necessitating a dark environment for photographic use.

U.S. Pat. No. 4,686,541, which issued to Rosier on Aug. 11, 1987, discloses extracting film from a reel with a first set of drive rollers, guiding the film along its edge into a cylindrical support, cutting it, holding the film to a cylindrical cradle with a vacuum, and exposing it.

In U.S. Pat. No. 4,698,647, which issued to Gerlach on Oct. 6, 1987, the end of a roll of film is fed into a pair of foam covered rollers, around sheet metal deflector guides, up and around two axially adjustable non-rotating mandrels, back through another set of deflector guides and out to another set of foam covered rollers. The rotor/hub sandwich is translated the axial length of the curved film. A film guide cap helps direct the film around the mandrels during the initial loading of film. The mandrels reduce the amount of exposable media. Additional film waste occurs at the ends near the mandrels because travel of the carriage-mounted hub arrangement is limited by the placement and structure of the mandrels. Although the guides and hubs are chromed, an unacceptable level of scratching will undoubtedly occur during film transport and carriage translation.

U.S. Pat. No. 4,816,923, filed by Saotome on Mar. 28, 1989, discloses a scanning device that uses drive rollers to feed a sheet into a cylindrical support. An edge guide at each end of the cylindrical support, spaced to allow insertion of the sheet, steers the sheet until it encounters a stop.

DISCLOSURE OF THE INVENTION

It is an object of the present invention to provide improved apparatus for accurately guiding a web of light sensitive recording media into a cylindrical support shoe.

According to a feature of the present invention, a printer having a stationary support shoe with an inlet side, an outlet side, and an at-least-partially cylindrical inner surface for receiving a web of light sensitive recording media, includes a metering roller at the inlet side of the stationary support shoe around which a received media web is wrapped. At least one media guide belt is mounted about a set of pulleys to guide media toward a nip between a pressure roller and the metering roller through which the media is driven into the stationary support shoe.

According to another feature of the present invention, the metering roller is mounted to rotate about a predetermined axis at the inlet side of the stationary support shoe and the pressure roller further has one end held in a frame. The other end of the pressure roller is pivotal about the axis of the metering roller, whereby the pressure roller can be steered so that the axis of the metering roller and the axis of rotation of the pressure roller are made parallel, and so that a nip formed between the metering roller and the pressure roller can be adjusted to lie in a plane defined by the axis of the metering roller and the axis of rotation of the pressure roller, wherein the media leaves the nip essentially tangent to a leading edge of the cylindrical inner surface of the support shoe.

The invention, and its objects and advantages, will become more apparent in the below description of the preferred embodiments.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
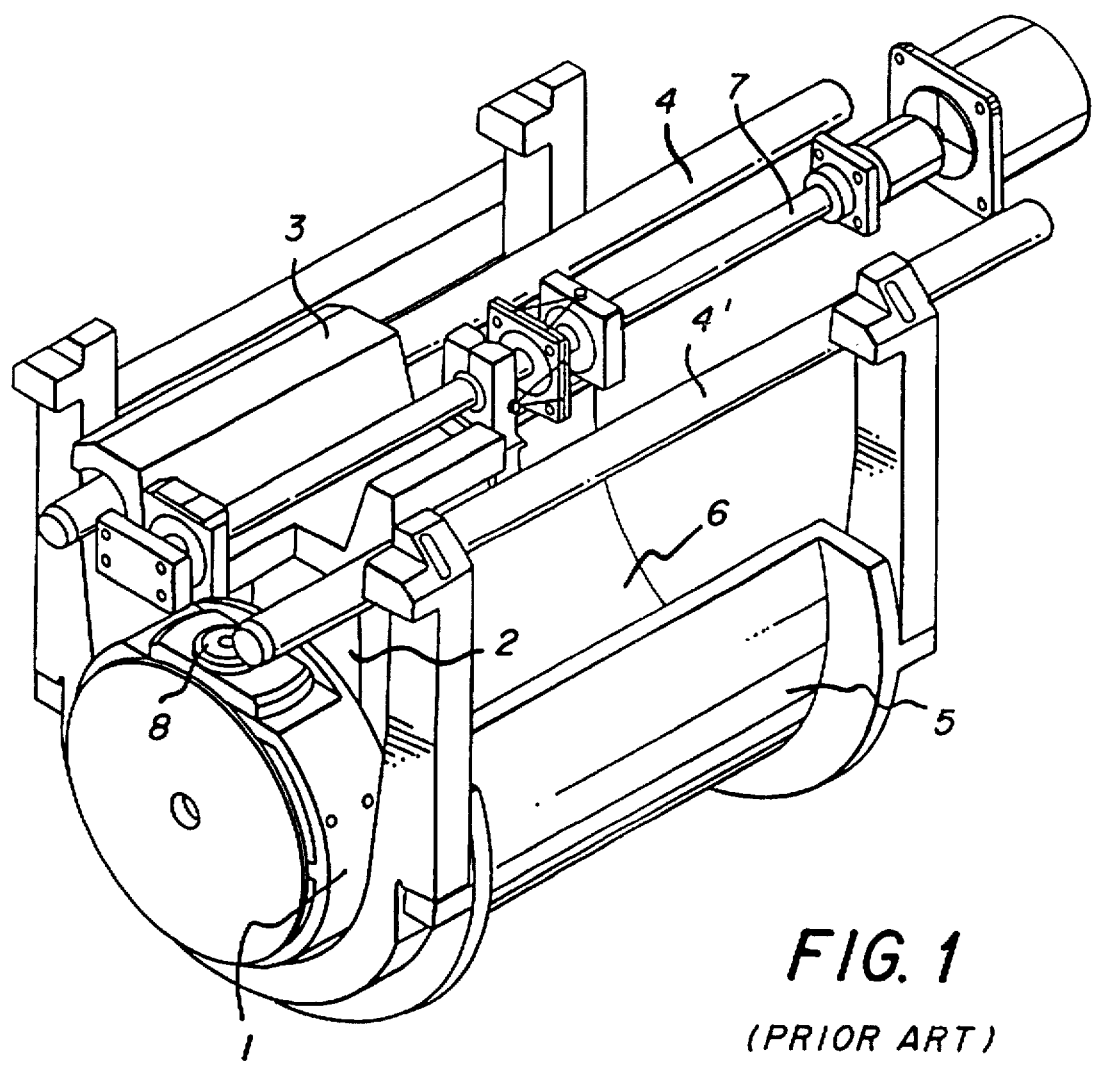
FIG. 1 a perspective view of a rotary printing system according to the prior art.

A rotary printing system employing a multi-position lens assembly is illustrated in FIG. 1, and includes a rotor 1 coupled to a drive motor, not shown, supported by a rotor support member 2 which hangs from a carriage assembly 3 which is supported for movement along a pair of guide rods 4 and 4'. The rotor is arranged to spin and move axially within a cylindrical support shoe 5 which is provided with a sheet of photosensitive material on the inner surface 6 thereof. Rotor 1 is attached to a linear translation assembly comprising rotor support member 2, carriage assembly 3, and a lead screw 7 driven by a stepper motor. See commonly assigned, co-pending U.S. patent application Ser. No. 08/123,838 entitled LEADSCREW COUPLER, filed in the names of Jadrich et al. on Sep. 20, 1993. The rotor is simultaneously rotated by the drive motor in a fast scan direction and is translated past the cylindrical support shoe in the slow scan direction (axially) by the stepper motor and lead screw 7, thereby achieving a raster scan pattern on the photosensitive media held within the support shoe.

An LED printhead assembly 8 is mounted in rotor 1 and comprises a plurality of mono-color light sources such as an array of LED's and a projection lens assembly. The printhead assembly is located within the body of rotor 1 with the LED array package positioned so that the LED aperture output surface is located in a plane which is perpendicular to the optical axis of the projection lens assembly. The projection lens assembly is arranged to simultaneously image (focus) all of the LED's in the array onto a surface located in close proximity above the outer surface of the rotor, and more particularly, onto the inner surface of the photosensitive material held by support shoe 5. A single projection optics lens array thereby images the plurality of LED's onto the photosensitive material as a plurality of individual images which constitute the writing beams that expose the image pixels. Additional details of the LED array and the generation of pixel control signals can be found in aforementioned U.S. patent application Ser. No. 08/123,839.

Paper Loading

Figure 2:
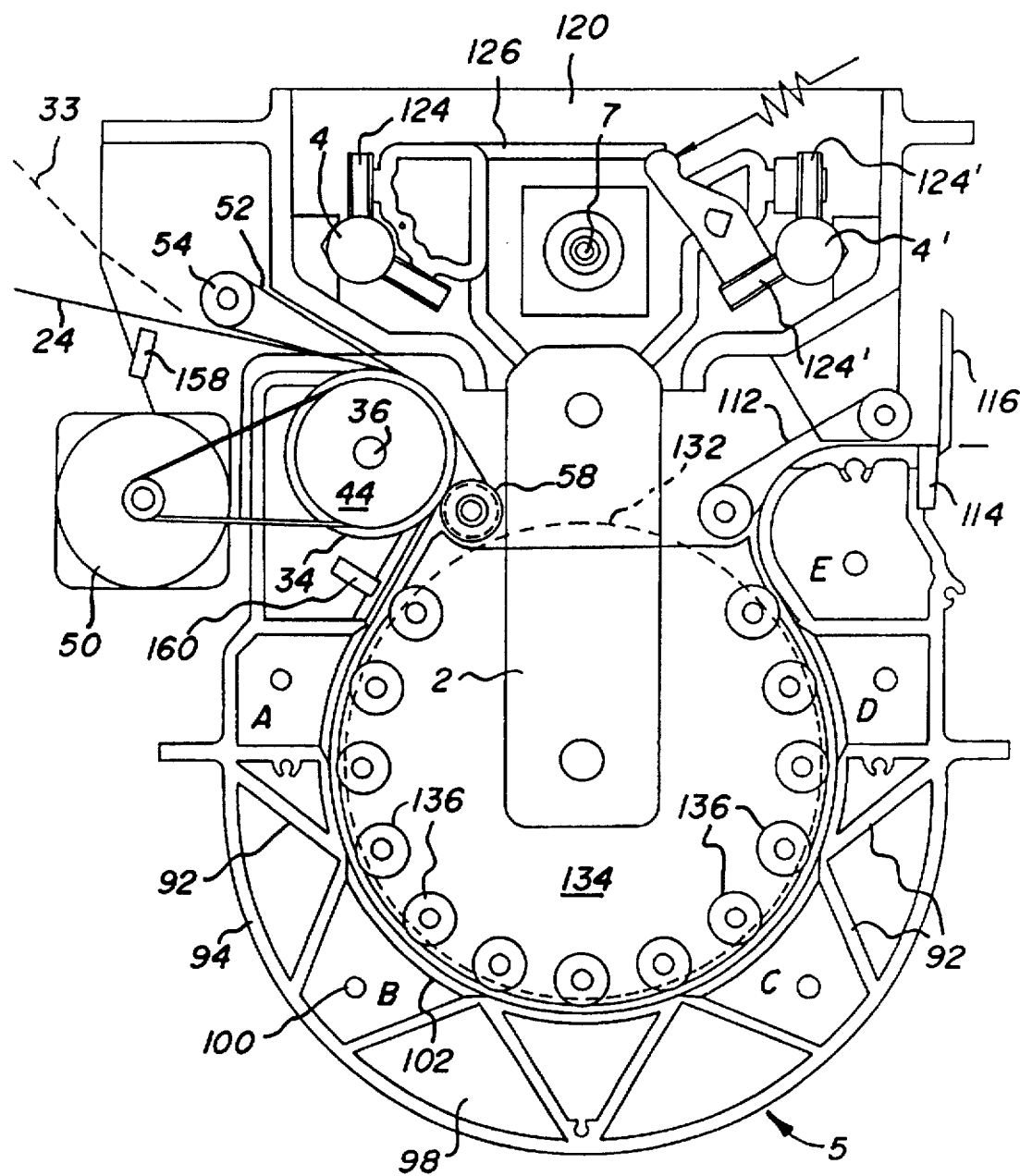
FIG. 2 is a general schematic illustration of apparatus according to a first preferred embodiment of the present invention.
Figure 3:
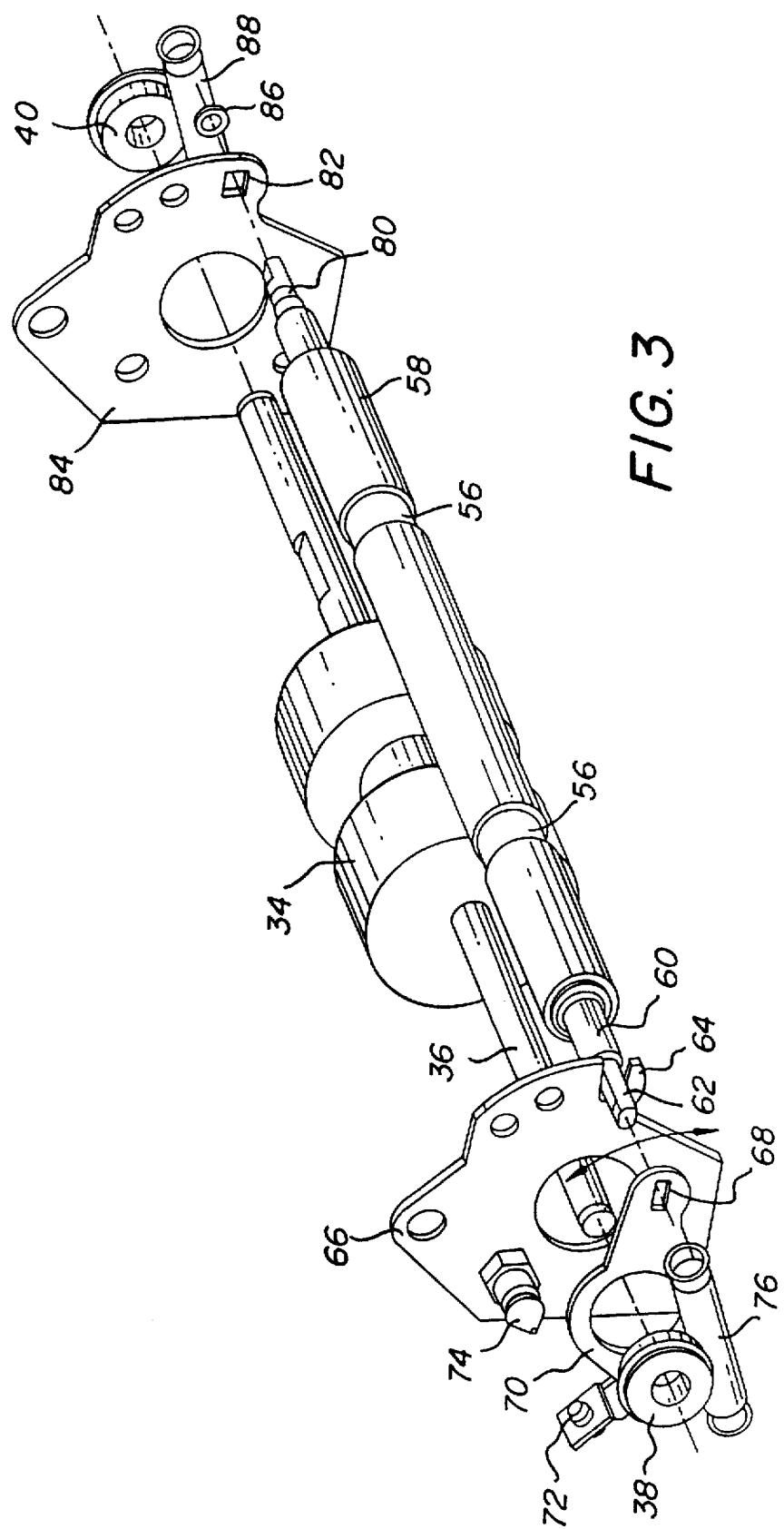
FIG. 3 is a view of the metering roller/pressure roller interface and adjustment means.
Figure 4:
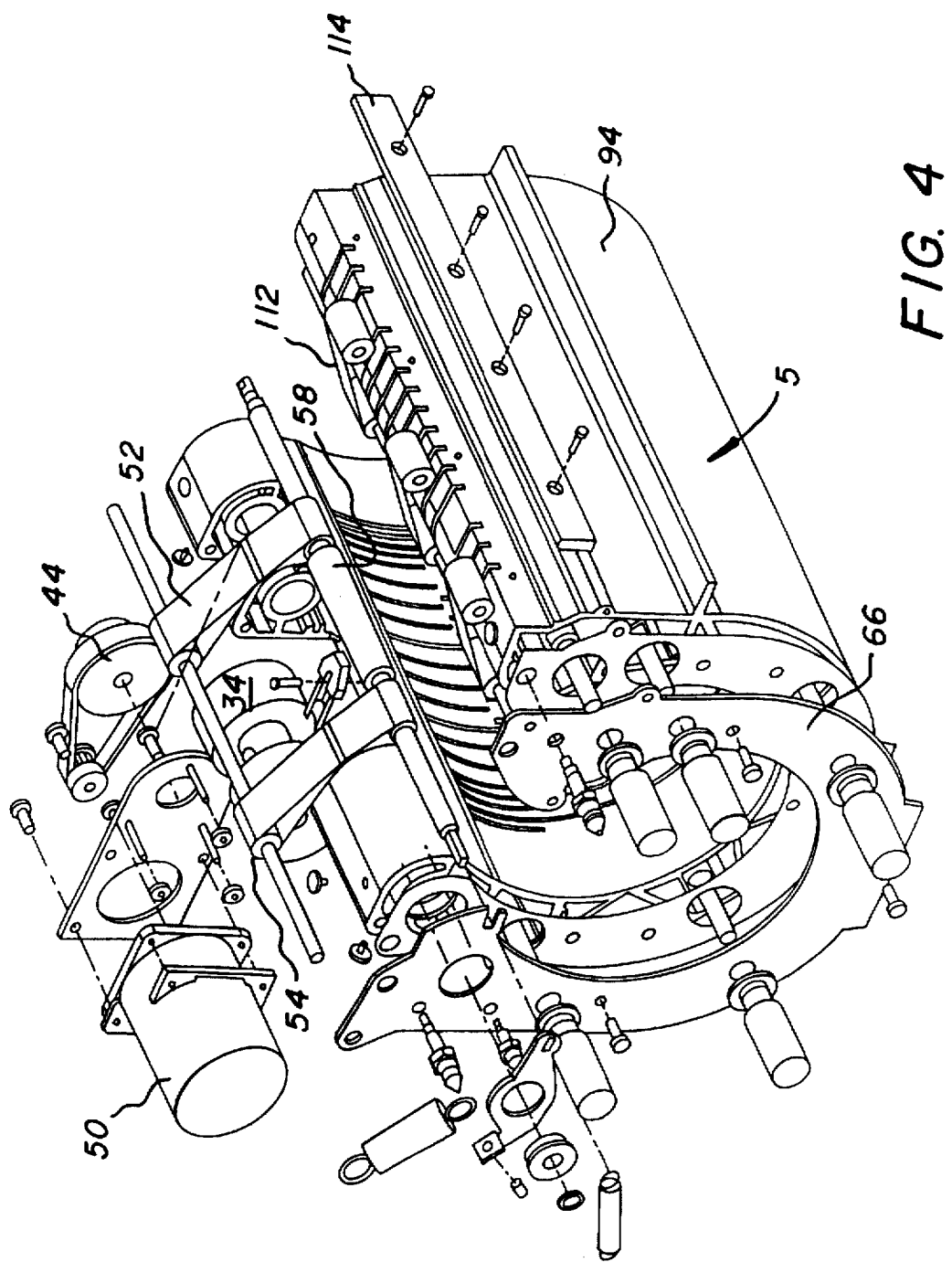
FIG. 4 is an exploded assembly view of the apparatus shown in FIG. 2.

Referring to FIG. 2, a web 24 of media is fed from an anti-backup roller, not shown, to a metering mechanism illustrated in detail in FIGS. 2, 3, and 4. The anti-backup roller and other web-supply features are further described in my commonly assigned, co-pending U.S. patent application Ser. No. 08/371,346, entitled PRINTER WITH SUPPORT SHOE AND ANTI-BACKUP ROLLER, filed concurrently herewith; the disclosure of which is specifically incorporated herein by reference.

A metering roller 34, with a covering of a material with a high coefficient of friction such as urethane, is supported on a metering roller shaft 36 by bearings 38 and 40. At the end of shaft 36 is a pulley 44 which is rotatably driven by a stepper motor 50 which responds to control signals from a stepper motor driver circuit, not shown.

Situated about metering roller 34 is a series of pliable media guide belts 52 which are rotatably, but not drivenly, mounted to a corresponding set of guide belt pulleys 54. Media guide belts 52 also loop around grooves 56 located on a pressure roller 58, the outer diameter of which has a low coefficient of friction coating, such as for example Delrin AF or anodized aluminum. Pressure roller 58 urges media 24 into contact with metering roller 34.

Pressure roller 58 is rotatably mounted on a pressure roller shaft 60, one end of which has a flat 62 that is pivotally limited by a slot 64 in an end cap 66 of cylindrical support shoe 5. Flat end 62 is further captured in a slot 68 in an adjustment plate 70. Adjustment plate 70 is rotatably arranged about bearing 38 for metering roller shaft 36. Adjustment is made by turning a set screw 72 which impinges on a stop 74 located on cylindrical support end cap 66. A spring 76 is arranged to bias flat end 62 against slot 68, to urge pressure roller 58 into metering roller 34, and to keep set screw 72 against stop 74. Adjustability is provided so that the axes of pressure roller 58 and metering roller 34 can be made parallel during assembly. The adjustment and exact constraint of pressure roller 58 maintains the nip between metering roller 34 and pressure roller 58 in an axially parallel condition regardless of forward or backward metering direction. Flat 62 and slot 68 interface keeps shaft 60 from rotating during metering.

On the other end of pressure roller shaft 60, a round 80 is loosely captured by slot 82 in cylindrical support end cap 84. The round end is axially held by a retaining ring 86. A spring 88 is arranged to bias round end 80 against a flat edge of slot 82, and to urge pressure roller 58 into metering roller 34.

As shown in FIG. 2, media 24 is fed between metering roller 34 and media guide belts 52, causing media 24 to be drawn into the nip between metering roller 34 and pressure roller 58. The arrangement of these rollers is such that, when media 24 leaves the roller nip, the media is essentially tangent to the leading edge of cylindrical support shoe 5.

Cylindrical Support Shoe

Cylindrical support shoe 5 is constructed so that numerous intermediate walls 92 and an outer wall 94 form individual triangularly-shaped manifold chambers A, B, C, D, and E, and non-manifold chambers 98, which contribute substantially to the self-rigidity of cylindrical support shoe 5. Two end caps (only end cap 66 is shown in FIG. 4) are secured at each end of support shoe 5 and have holes 100 opening onto manifold chambers A to E, to which are attached means to selectively connect a vacuum source, not shown.

The arcuate inner surface of support shoe 5 has radial slots 102, best seen in FIG. 4, which communicate the vacuum distributed by manifold chambers A to E to the back side of media 24. The vacuum intimately holds media 24 to the arcuate inner surface.

A second set of media guide belts 112, rotatably supported, but not driven by, guide belt pulleys, serve to guide media 24 around cylindrical manifold chamber E. A first cutting edge 114 of a knife is attached to cylindrical support shoe 5. A second cutting edge 116 is slidably mounted to impinge upon first cutting edge 114 to thereby create knife means to separate a media sheet from media web 24.

Carriage Assembly

A translator base assembly 120 is attached via vibration absorbing mounts, not shown, to the framework of the light-tight cabinet 10 and supports guide rods 4 and 4'. Two sets of wheels 124 and 124' are rotatably attached to a carriage 126 which translates along guide rods 4 and 4' by means of lead screw 7 turned by a lead screw motor, not shown. See afore-mentioned U.S. patent application Ser. No. 08/123,838 entitled LEADSCREW COUPLER. Rotor support member 2 is rigidly attached to carriage 126, and carries a rotor 132 depicted by the dashed circle upon which is mounted the illumination means, not shown. Also attached to rotor support member 2 is a media guide member 134 that carries a plurality of rollers 136 angularly distributed around the periphery of media guide member 134.

Operation

A leader of media 24 is urged into a guide way formed by media guide belt 52 and metering roller 34. A sensor means 158 signals the presence of media 24 in it's location and signals metering roller 34 to drive in a clockwise direction. This has the effect of drawing media 24 into the nip between metering roller 34 and pressure roller 58. A second sensor means 160 is located downstream of the roller nip and turns off drive signals to metering roller 34 when the leading edge of media 24 is present.

Metering roller 34 is rotated by stepper motor 50 in response to control signals which causes media 24 to be driven into the space gap created by rollers 136 of media guide member 134 and the cylindrical support surface of support shoe 5.

Operation of support shoe 5 to expose media 24 is fully described in my commonly assigned, co-pending U.S. patent application Ser. No. 08/371,241, entitled DIGITAL PRINTER WITH SUPPORT SHOE AND TRANSLATABLE MEDIA GUIDE MEMBER THEREIN, filed concurrently herewith, the disclosure of which is specifically incorporated herein by reference.

The invention has been described in detail with particular reference to preferred embodiments thereof, but it will be understood that variations and modifications can be effected within the spirit and scope of the invention.

What is claimed is:

1. A printer comprising:
   a stationary support shoe with an inlet side, an outlet side, and an at-least-partially cylindrical inner surface for receiving a web of light-sensitive recording media;
   a metering roller at the inlet side of the stationary support shoe around which a received media web is wrapped;
   a pressure roller opposed to the metering roller; and
   at least one media guide belt mounted about a set of pulleys to guide media toward a nip between the pressure roller and the metering roller through which the media is driven into the stationary support shoe.

2. A printer as set forth in claim 1 wherein the metering roller is covered with a material having a high coefficient of friction.

3. A printer as set forth in claim 1 wherein the metering roller is driven by a stepper motor.

4. A printer as set forth in claim 1 wherein the pressure roller is spring loaded toward the metering roller.

5. A printer as set forth in claim 1 wherein:
   the metering roller has a fixed axis of rotation; and
   one end of the pressure roller is spring loaded toward the metering roller and is carried by an adjustment plate that is pivoted about the axis of the metering roller.

6. A printer comprising:
   a stationary support shoe with an inlet side, an outlet side, and an at-least-partially cylindrical inner surface for receiving a web of light-sensitive recording media;
   a frame;
   a metering roller mounted to rotate about a predetermined axis at the inlet side of the stationary support shoe around which a received media web is wrapped; and
   a pressure roller having an axis of rotation, the pressure roller further having a first end held in the frame and a second end pivotal about the predetermined axis of the metering roller, whereby the pressure roller can be steered so that the predetermined axis of the metering roller and the axis of rotation of the pressure roller are made parallel, and so that a nip formed between the metering roller and the pressure roller adjusts to lie in a plane defined by the predetermined axis of the metering roller and the axis of rotation of the pressure roller.

7. A printer as set forth in claim 6 wherein the pressure roller is covered with a material having a low coefficient of friction.

8. A printer as set forth in claim 6 wherein the media leaves the nip formed between the metering roller and the pressure roller essentially tangent to a leading edge of the cylindrical inner surface of the support shoe.

9. A printer as set forth in claim 6 further comprising:
   a pressure roller shaft, the pressure roller being rotatably mounted on the shaft; and
   a flat defined on one end of the pressure roller shaft, said flat being received in and pivotally limited by a slot in the frame.

10. A printer as set forth in claim 9 further comprising:
    a plate at one end of the pressure roller, said plate being adjustably mounted for rotation about the predetermined axis of the metering roller; and
    means on the plate for capturing the one end of the pressure roller shaft.

11. A printer as set forth in claim 10 further comprising:
    a stop on one of the frame and the plate; and
    a set screw on the other of the frame and the plate, the set screw impinging on the stop, whereby adjustment may be made to the position of one end of the pressure roller about the metering roller by turning the set screw.

12. A printer as set forth in claim 11 further comprising a spring arranged to bias the flat against an edge of the slot to urge the pressure roller toward the metering roller and to keep the set screw against the stop.

* * * * *